(12) United States Patent
May et al.

(10) Patent No.: US 8,908,852 B2
(45) Date of Patent: Dec. 9, 2014

(54) SYSTEM AND METHOD OF PROVIDING LOCAL NUMBER PORTABILITY

(75) Inventors: Anna Marie May, Colorado Springs, CO (US); Ralph S. Hoefelmeyer, Colorado Springs, CO (US); Harry C. Leung, Fredericksburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1384 days.

(21) Appl. No.: 12/509,173

(22) Filed: Jul. 24, 2009

(65) Prior Publication Data

US 2011/0019811 A1    Jan. 27, 2011

(51) Int. Cl.
*H04M 7/00* (2006.01)
*H04L 12/66* (2006.01)
*H04L 29/06* (2006.01)
*H04M 3/42* (2006.01)

(52) U.S. Cl.
CPC ...... *H04L 12/66* (2013.01); *H04Q 2213/13102* (2013.01); *H04Q 2213/13093* (2013.01); *H04L 65/1096* (2013.01); *H04L 65/1069* (2013.01); *H04M 7/006* (2013.01); *H04M 3/42297* (2013.01); *H04Q 2213/13097* (2013.01); *H04Q 2213/13096* (2013.01)

USPC .................................... 379/221.13; 370/352

(58) Field of Classification Search
USPC ............ 379/221.08, 221.11, 221.13, 221.14; 370/352–356
See application file for complete search history.

(56) References Cited

U.S. PATENT DOCUMENTS

| | | | |
|---|---|---|---|
| 6,370,548 B1 * | 4/2002 | Bauer et al. | 379/221.13 |
| 6,625,273 B1 * | 9/2003 | Ashdown et al. | 379/221.13 |
| 6,678,265 B1 * | 1/2004 | Kung et al. | 370/352 |
| 7,042,999 B2 | 5/2006 | Goldstein et al. | |
| 7,627,108 B1 * | 12/2009 | Enzmann et al. | 379/221.13 |
| 2005/0185672 A1 * | 8/2005 | Endo et al. | 370/466 |

FOREIGN PATENT DOCUMENTS

WO    WO 2009/072776    *    8/2008

* cited by examiner

*Primary Examiner* — Nafiz E Hoque

(57) ABSTRACT

A system for and method of providing local number portability is presented. A request may be received to establish a session between an origination user agent and a destination user agent. The request may comprise a destination user agent identifier. It may be determined whether the destination user agent identifier was ported from one service provider to another. If so, routing information may be provided for establishing the session through the second service provider rather than through the first service provider. The session may be established over one or more Internet protocol networks.

20 Claims, 13 Drawing Sheets

SYSTEM AND METHOD OF PROVIDING LOCAL NUMBER PORTABILITY

BACKGROUND INFORMATION

In many circumstances, it may be difficult or burdensome for a telecommunication device user to change service providers, locations, or other features of the user's service. For example, when a user switches service providers, the user device may be associated with a new telephone number that needs to be remembered, distributed, and used in the future. Local number portability may allow a user to keep the same telephone number whenever the user makes changes to his or her service. Calls that would be directed to the user's previous service provider may then be directed to the user's new service provider.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
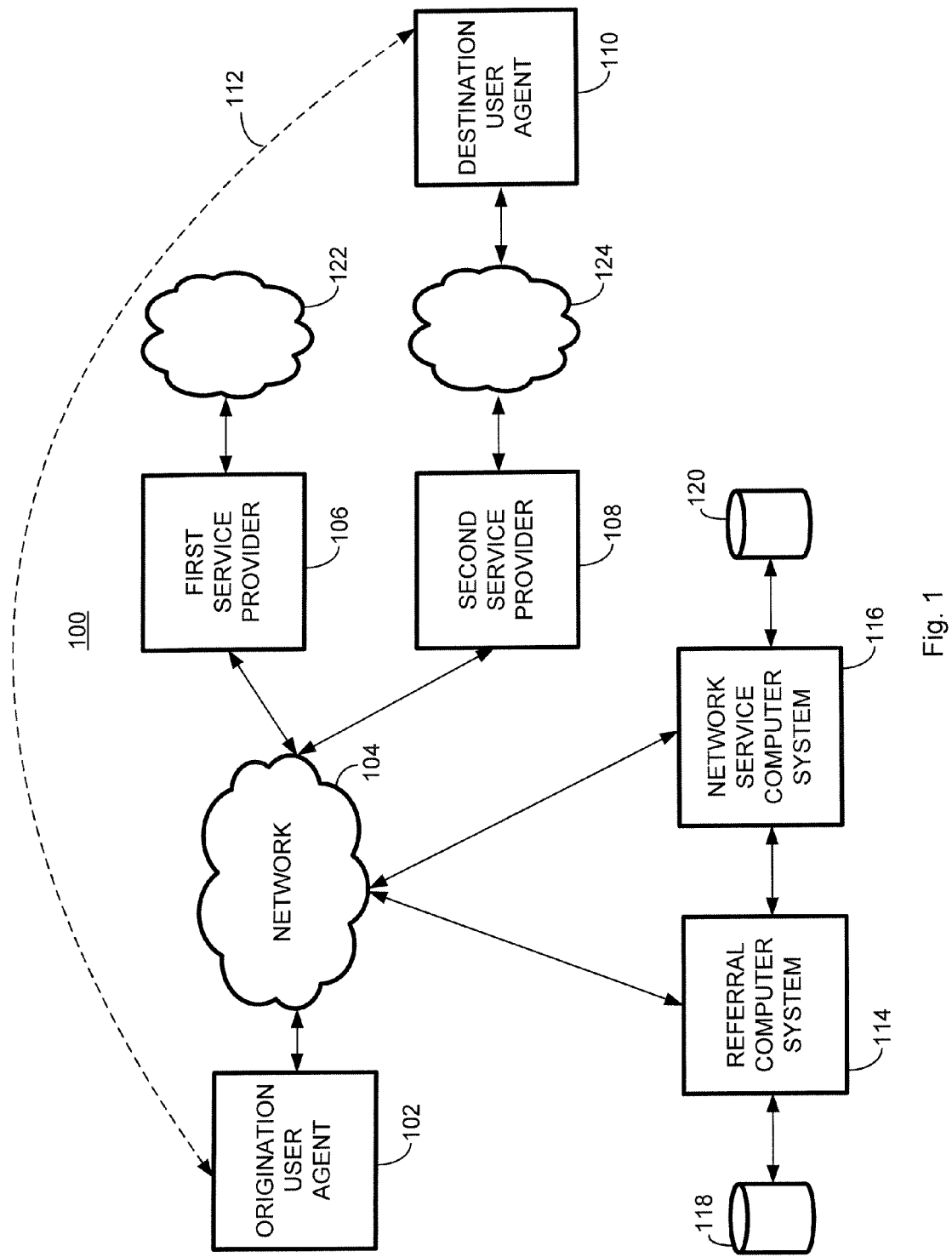
FIG. 1 is a schematic diagram illustrating a system according to a particular embodiment.

A system and method may include various embodiments for providing local number portability. Local number portability may be provided to establish a session between an origination user agent and a destination user agent over one or more packet-switched networks (e.g., an Internet Protocol ("IP") network). For example, an individual may desire to place a call to a friend who uses an IP phone. The individual may dial a telephone number corresponding to the IP phone. The individual's service provider may determine that the dialed number was ported and, instead of directing the call to the friend's old service provider, may direct the call to that person's new service provider. The new service provider may map the number to a dynamic IP address, or any other type of identifier, if necessary to route the call to the person's IP phone. As is well known, communication over an IP network may be by Internet protocol version 4 ("IPv4") or Internet protocol version 6 ("IPv6"). Other IP versions may be used as well. Any other type of network, such as a public switch telephone network ("PSTN"), may also be used, as described herein.

In various embodiments, local number portability may allow one identifier (e.g., telephone number) to be used regardless of a user's service provider. Local number portability may refer to a telecommunication service that offers, for example, service provider portability, service portability, and/or location portability. Service provider portability may give users the ability to obtain service from any service provider, while retaining the same telephone number. Service portability may allow users to obtain any available telecommunication services, while retaining their number. Location portability may permit users to retain their telephone number when they relocate to a new location. In various embodiments, a system and method may be provided for the seamless transition of a telephone number across multiple carrier networks without a change in the number.

The description below describes communication modules, determination modules, routing modules, user agents, service portals, service providers, computer systems, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made.

FIG. 1 is a schematic diagram illustrating a system according to a particular embodiment. A system 100 may include an origination user agent 102, a network 104, a first service provider 106, a second service provider 108, a destination user agent 110, a referral computer system 114, a network service computer system 116, a data storage 118, a data storage 120, a network 122, and/or a network 124. Although elements of system 100 may be described as a single device, it will be appreciated that multiple instances of these devices may be included in system 100, such as, for example, multiple user agents, multiple service providers, multiple referral computer systems, multiple network service computer systems, and multiple networks. A user may be associated with origination user agent 102 and another user may be associated with destination user agent 110. The user associated with origination user agent 102, for example, may desire to make a call to the user associated with destination user agent 110.

Origination user agent 102 and/or destination user agent 110 may each be, for example, but not limited to, a cellular telephone, Session Initiation Protocol ("SIP") phone, software client/phone, a desktop computer, a laptop/notebook, a server, a module, a telephone, a satellite phone, or a communication device, such as a personal digital assistant ("PDA"), a mobile phone, a smart phone, a remote controller, a personal computer ("PC"), a workstation, a mobile device, a phone, a handheld PC, a handheld MP3 player, a handheld video player, a personal media player, a gaming device, a thin system, a fat system, a network appliance, and/or other mobile communication device that may be capable of transmitting and/or receiving data. Also, origination user agent 102 and/or destination user agent 110 may include one or more transmitters, receivers, and/or transceivers to transmit and/or receive one or more signals to and/or from other components depicted in FIG. 1, including, for example, referral computer system 114, network service computer system 116, first service provider 106, and/or second service provider 108.

Networks 104, 122, and 124 may each be a wireless network, a wired network, or any combination of wireless network and wired network. For example, networks 104, 122, and 124 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, networks 104, 122, and 124 may include, without limitation, telephone line, fiber optics, IEEE Ethernet 802.3, a wide area network ("WAN"), a local area network ("LAN"), or a global network such as the Internet. Also, networks 104, 122, and 124 may support, an Internet network, a wireless communication network, a cellular network, or the like, or any combination thereof. Networks 104, 122, and 124 may further include one, or any number of the exemplary types of networks mentioned above operating as a stand-alone network or in cooperation with each other. Networks 104, 122, and 124 may utilize one or more protocols of one or more network elements to which it is communicatively coupled. Networks 104, 122, and 124 may translate to or from other protocols to one or more protocols of network devices. Although networks 104, 122, and 124 are each depicted as one network, it should be appreciated that according to one or more embodiments, networks 104, 122, and 124 may comprise a plurality of interconnected networks, such as, for example, a service provider network, the Internet, a broadcaster's network, a cable television network, corporate networks, and home networks.

The components depicted in FIG. 1 may transmit and receive data to and from networks 104, 122, and 124 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Networks 104, 122, and 124 may use standard wireless protocols including IEEE 802.11a, 802.11b and 802.11g. Networks 104, 122, and 124 may also use protocols for a wired connection, such as an IEEE Ethernet 802.3.

The components depicted in FIG. 1 may also be connected to networks 104, 122, and 124, and each other, by one or more service portals (not shown), which may be, for example, but not limited to, a cellular telephone network signal tower, an Internet service provider router, a telephone adapter, a telephone router, an Ethernet router, a satellite router, a fiber optic router, a co-axial cable router, an Internet router, and/or other routing device that may provide and/or determine a transmission path for data to travel. Such service portals may also include a computer, software, and/or hardware to facilitate a routing and/or forwarding function of a signal.

Referral computer system 114 may include one or more devices, modules, and/or components for providing routing information for transmitting data over a network, such as, for example, an IP network and/or a PSTN. For example, referral computer system 114 may be part of, or communicatively coupled to, the service provider of the user associated with origination user agent 102, and may receive a request to provide routing information for establishing a call between original user agent 102 and destination user agent 110. Referral computer system 114 may include one or more computer systems and/or processors to provide routing services. Referral computer system 114 may include a communication module, a determination module, and a routing module, as described herein in reference to FIG. 2. Referral computer system 114 may include, or be communicatively coupled to, data storage 118 for providing routing services. Also, in various embodiments, referral computer system 114 may be a resolution server or may be a module of, or communicatively coupled to, a Domain Name System ("DNS") server, such as a BIND server, for converting host names and domain names into IP addresses over the Internet.

Network service computer system 116 may include one or more devices, modules, and/or components for providing network service for establishing and/or completing a session (e.g., a call) over a network. Network service computer system 116 may include, for example, computing software, firmware, and/or hardware for supporting SIP. In various embodiments, network service computer system 116 may be one or more Network Server/Redirect Servers (NS/RS), which may be included together or communicatively coupled to each other. Network service computer system 116 may also support the authentication and/or registration of user agents over a network (e.g., by receiving and/or providing presence information). Network service computer system 116 may further include or be communicatively coupled to data storage 120 for providing network services.

Data storage 118 and data storage 120 may each be network accessible storage and may be local, remote, or a combination thereof to the components depicted in FIG. 1. Data storage 118 and data storage 120 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage 118 and data storage 120 may be a database, such as an Oracle database, a Microsoft SQL Server database, a DB2 database, a MySQL database, a Sybase database, an object oriented database, a hierarchical database, or other database. Data storage 118 and data storage 120 may utilize flat file structures for storage of data. Data storage 118 and data storage 120 may be communicatively coupled to referral computer system 114 and network service computer system 116, to each other, or to any other component depicted in FIG. 1. Any of the other components depicted in FIG. 1 may include one or more data storages as well.

First service provider 106 and second service provider 108 may include one or more devices, modules, and/or components for recording, transmitting, routing, receiving, and/or storing data over a network, such as, for example, an IP network and/or a PSTN. For example, first service provider 106 may be the cellular telephone carrier of the user associated with destination user agent 110. Each of first service provider 106 and second service provider 108 may be responsible for a set of identifiers (e.g., telephone numbers) and may administer one or more networks. As depicted in FIG. 1, first service provider 106 may administer network 122 and second service provider 108 may administer network 124. Although first service provider 106 and second service provider 108 are depicted as individual elements in FIG. 1, it should be appreciated that the contents of first service provider 106 and second service provider 108 may be combined into fewer or greater numbers of devices and may be connected to additional devices not depicted in FIG. 1. Furthermore, the one or more devices may be local, remote, or a combination thereof.

Figure 2:
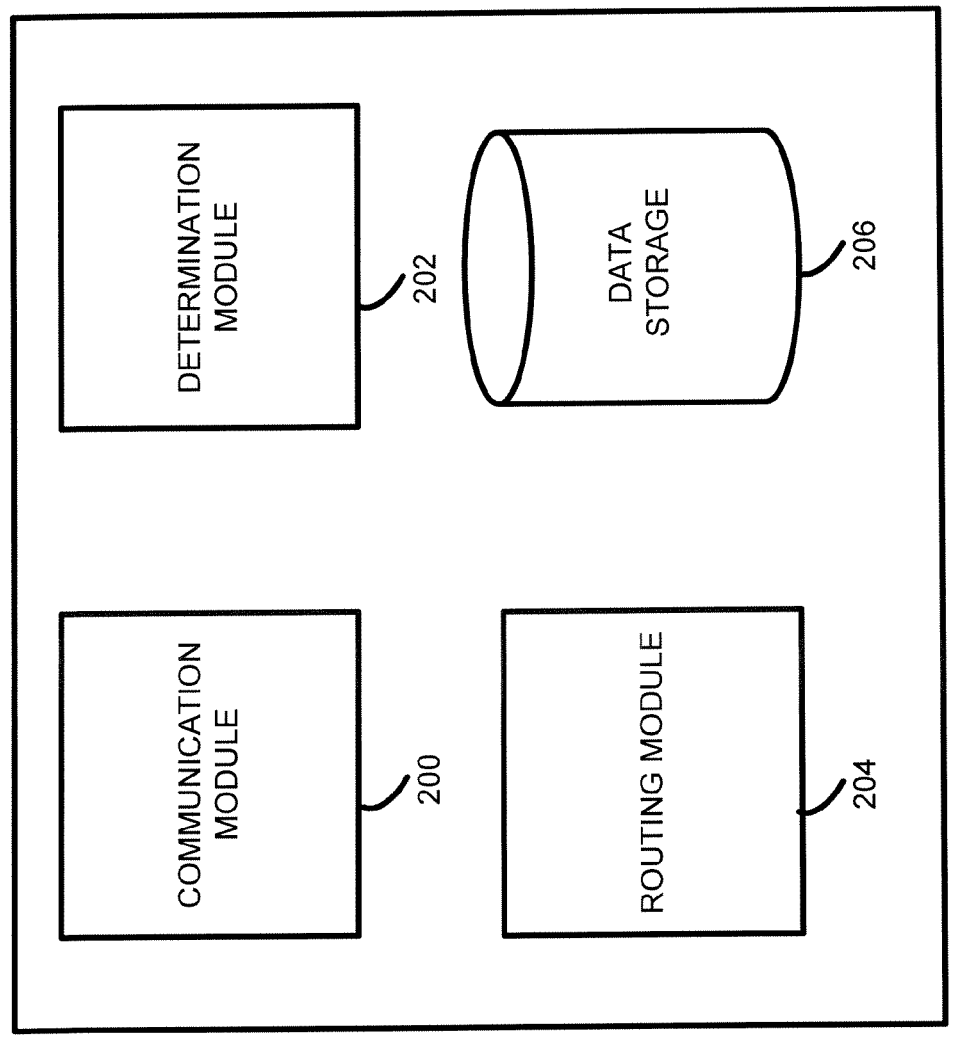
FIG. 2 is a block diagram of a hardware component of the system of a particular embodiment.

FIG. 2 is a block diagram of a hardware component of the system of a particular embodiment. For example, referral computer system 114 may include a communication module 202, a determination module 202, and a routing module 204. It is noted that modules 200, 202, and 204 are examples and the functions performed by one or more of the modules may be combined with that performed by other modules. The functions described herein as being performed by modules 200, 202, and 204 may also be separated and may be performed by other modules at devices local or remote to referral computer system 114. The modules may each be a computer program or an appropriately programmed computer, such as a mainframe or personal computer, or may include a plurality of such computers cooperating to perform the functionality described herein. Modules 200, 202, and 204 may also communicate with data storage 206. Modules 200, 202, and 204 may also be coupled to or integrated with referral computer system 114. For example, modules 200, 202, and 204 may be external devices that are wirelessly coupled and/or communicatively coupled to referral computer system 114 via an interface port which may include, without limitation, USB ports, system bus ports, or Firewire ports and other interface ports. Further, computer code may be installed on referral computer system 114 to control and/or operate a function of communication module 200, determination module 202, and/or routing module 204.

It is well known that users may want to switch service providers for various reasons, such as to obtain cheaper or better service. When a user changes service providers, the user's unique identification, such as a telephone number, may be "ported" from the old service provider's network to the new service provider's network. Every call made to the "ported" device (e.g., cellular telephone, IP phone) may then have to be directed to the new service provider's network.

As depicted in FIGS. 1 and 2, the user associated with destination user agent 110, for example, may switch his or her IP phone service from first service provider 106 to second service provider 108, but may desire to keep his or her old telephone number. For example, number (123) 456-7890 may be in the address space belonging to first service provider 106 and may have been given out to the user associated with destination user agent 110 by first service provider 106. The user may then notify first service provider 106 that he would like to change his or her service to second service provider 108. When an incoming call is made to the user, however, the service provider of the calling party may have no idea that the destination user made the change, and so the call may not get through.

To avoid this problem, an indication may be provided to referral computer system 114 to alert it of the change and instruct that all calls to the "ported" destination user agent 110 should be "referred" to second service provider 108 instead of first service provider. In various embodiments, referral computer system 114 may be part of, or communicatively coupled to, the service provider for origination user agent 102. The indication may come from any source and may take any form. For example, when a switch occurs, first service provider 106 and/or second service provider 108 may update their databases (or other data storage) to reflect the change and either service provider may provide an electronic message to communication module 200 of referral computer system 114. Or communication module 200 may query first service provider 106 and/or second service provider 108.

The indication may also result from a type of trial-and-error process. For example, prior to receiving a session request, another caller (not shown) may have attempted to place a call to the number associated with destination user agent 110. In that earlier case, referral computer system 114 may have attempted to complete the call through first service provider 106 because the number was in the address space of first service provider 106, or because first service provider was the last "known" service provider for destination user agent 110. First service provider 106, however, may have responded with an indication that the number was ported to second service provider 108 and so the call cannot be completed through first service provider 106. Based on that information, referral computer system 114 may then route the call through second service provider 108 instead and store an indication that the number was ported so that it may establish a call correctly the next time the number is dialed. Or, if second service provider 108 indicated that the number had been again ported to a third service provider (not shown), referral computer system 114 may complete the call through the third service provider and store such an indication. This process may occur repeatedly until the call can be completed. Once a call goes through correctly, referral computer system 114 may store an indication reflecting the "ported" service provider in data storage 206, such as a cache or database, or data storage 118. The indication may be stored for a fixed period of time (e.g., 24 hours) to reflect only the most recent changes in service, or it may be stored indefinitely. New indications may be received as necessary or periodically as well.

Also, after receiving an indication that a number was ported, referral computer system 114 may verify with first service provider 106 that the user in fact intended to have his or her number ported. If the verification is affirmative, or if first service provider 106 does not respond, referral computer system 114 may store the indication and use it going forward. If the verification is negative, however, referral computer system 114 may ignore the indication and/or seek clarification from another component. As depicted in FIGS. 1 and 2, referral computer system 114, first service provider 106, and second service provider 108 may cooperate to share information regarding identifiers that are ported (e.g., they agree to provide updates to each other as they occur). Also, if a user cancels service, referral computer system 114 may store an indication reflecting that change as well, and may notify the dialing user associated with origination user agent that the call cannot be completed. In that case, the service provider that had the number in its address space may reuse the number by reassigning it to another user.

Communication module 200 of referral computer system 114 may then receive a request to establish a session between origination user agent 102 and destination user agent 110. The session may be for communicating voice and/or data. For example, origination user agent 102 may attempt to make a call to destination user agent 110 using an identifier (e.g., telephone number) associated with destination user agent 110 and/or the user associated with destination user agent 110. Doing so may cause a request to be generated and sent to referral computer system 114. The request may, for example, originate at origination user agent 102, any service portals, and/or any component or device in network 104. The request may include information associated with the desired call, such as an identifier for destination user agent 110 and/or an identifier for origination user agent 102. The request may be a routing request. In various embodiments, the request may be received over an IP network, such as an IPv6 network. For example, origination user agent 102 may be an IPv6 phone and network 104 may include an IPv6 WAN.

The identifier for destination user agent 102 may be in any format. For example and without limitation, it may be a telephone number, an E.164 Number Mapping ("ENUM") number, a private number, an abbreviated number that translates to a public or private number (e.g., a speed dial number), a Uniform Resource Identifier ("URI"), or any other suitable number, and/or any combination thereof. In various embodiments, the identifier may be a telephone number used to reach an IP device over an IP network. In that case, the telephone number may be used to reach the correct second service provider 108, and second service provider 108 may map that number to a dynamic IP address registered to destination user agent 110 and route the call to destination user agent 110.

The request may also be received as part of normal name resolution. For example, referral computer system 114 may include a DNS server and may receive a request to convert a host name and domain name for destination user agent 110 into an IP address. Referral computer system 114 may then use the received host name and domain name to route the session to second service provider 108 and/or determine an IP address (utilizing data storage 206, for example) to reach destination user agent 110. Referral computer system 114 may also communicate with network service computer system 116 to do so as well.

As depicted in FIG. 2, determination module 202 of referral computer system 114 may determine that the received identifier was ported from first service provider 106 to second service provider 108. For example, determination module 202 may search data storage 206 or data storage 118 for the dialed number to find the indication, which may associated with the number that was dialed. Data storage 206 and/or data storage 118 may be modified as necessary based on new information received, for example, over network 104.

In various embodiments, local number portability may be achieved by providing routing information for establishing a session (e.g., a call) from origination user agent 102 to destination user agent 110. The routing information may include locations, instructions, and/or other information for reaching second service provider 108 and/or destination user agent 110. For example, second service provider 108 may provide information to referral computer system 114 to instruct referral computer system 114 how to appropriately route incoming calls through various networks to reach second service provider 108, and referral computer system 114 may use that information to create routing information for the session. Once a call reaches second service provider 108, it may map the number to another identifier (e.g., IP address for which destination user agent 110 is currently registered) as necessary to complete the call. Destination user agent 110 may also broadcast information regarding its capabilities, handling information, and/or information regarding what calls should be redirected and when, for example. Referral computer system 114 may receive such information from second service provider 108 and/or destination user agent 110 (or any other component depicted in FIG. 1) and use that information to create routing information for reaching destination user agent 110 through second service provider 108.

The routing information may also indicate how a call should be completed and/or how a call should be handled. For example, routing information may indicate that a call may be established and data transferred for a call from origination user agent 102 (e.g., an IPv6 phone) to various service portals, to network 104 (e.g., an IPv6 WAN), to other service portals, to second service provider 108, to network 124, and finally to destination user agent 110 (e.g., an IPv6 phone). The routing information may also indicate what destination user agent 110 may require for session connection. The routing information may be stored in data storage 206 and/or data storage 118 for later use as necessary. Or the routing information may be received from any other entity or component (e.g., by querying network 104). The routing information may also comprise an identifier.

As depicted in FIG. 2, routing module 204 of referral computer system 114 may provide the routing information for establishing the session. For example, the routing information may be provided to various service portals, origination user agent 102, second service provider 108, and/or destination user agent 110 so that a connection may be established between origination user agent 102 and destination user agent. The routing information may be provided to any other entity or component as well. As described herein, an identifier (e.g., telephone number) associated with destination user agent 110 may have been "ported" from first service provider 106 to second service provider 108. Referral computer system 114 may therefore provide routing information to various service portals so that the call may be appropriately connected through second service provider 108. The routing information may indicate how the call should be routed over one or more networks using different networking protocols. The routing information, for example, may identify service portals corresponding to second service provider 108 and/or destination user agent 110 so that other service portals may route the call through second service provider 108. The routing information may also identify capabilities of destination user agent 110 and/or other components. The routing information may be provided as one or more parameters sent along with other data that may be provided.

Once the routing information is provided, the call may proceed, as shown by a connection 122 depicted in FIG. 1. For example, SIP may be used to set up and tear down the call session between origination user agent 102 and destination user agent 110 and/or to negotiate the capabilities for the session. Real-Time Transport Protocol ("RTP") may be used to transfer data during the call across one or more IP networks.

In various embodiments, referral computer system 114 may also act an interpreter for the conversion of identifiers as necessary. Depending on what networks must be traversed to reach second service provider 108 and destination user agent 110, referral computer system 114 may modify the received identifier's format. For example, in an IPv6 environment, when a telephone number is received, it may be translated to an IPv6 address. It is well known that the addressing schemes of various networks may be different (e.g., 32 bits for IPv4, 128 bits for IPv6). Referral computer system 114 (or any other component depicted in FIG. 1) may make any conversion necessary for routing data over an IPv4 or IPv6 network.

FIGS. 3-12 are schematic diagrams illustrating systems according to particular embodiments involving calls routed from a particular device to another device over one or more IP networks. The systems depicted in FIGS. 3-12 are provided by way of example only, as there a variety of routing methods described herein. As described herein, routing may be accomplished by referral computer system 114 providing routing information after receiving a request to establish a call. The various entities and components described herein may communicate using any communication mechanism and/or networking protocol, such as, for example and without limitation, IPv4, IPv6, analog telephone, and/or wireless telephone. Various components shown in FIGS. 3-12, such as IPv6 router in FIG. 3, for example, may be part of, or communicatively coupled to, second service provider 108 for routing a call to destination user agent 110 (e.g., second IPv6 fixed phone 318 in FIG. 3).

Figure 3:
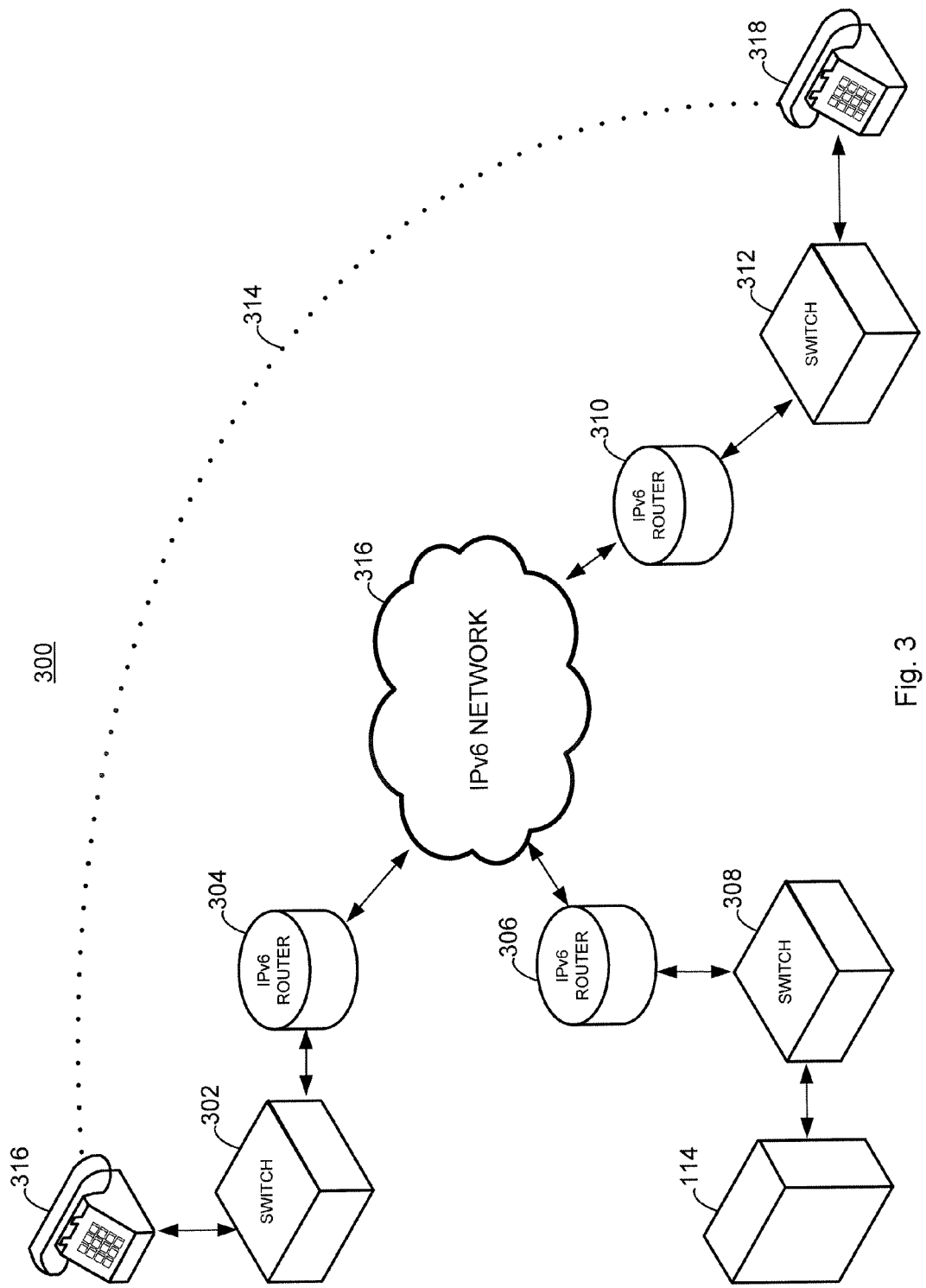
FIG. 3 is a schematic diagram illustrating a system according to a particular embodiment involving a call routed from an IPv6 fixed phone to another IPv6 fixed phone.

FIG. 3 is a schematic diagram illustrating a system according to a particular embodiment involving a call routed from an IPv6 fixed phone to another IPv6 fixed phone. A system 300 may include a first IPv6 fixed phone 316 (e.g., origination user agent 102), a switch 302, an IPv6 router 304, an IPv6 network 316 (which may be part of network 104 or network 124, for example), an IPv6 router 306, a switch 308, referral computer system 114, an IPv6 router 310, a switch 312, and a second IPv6 fixed phone 318 (e.g., destination user agent 110).

Figure 4:
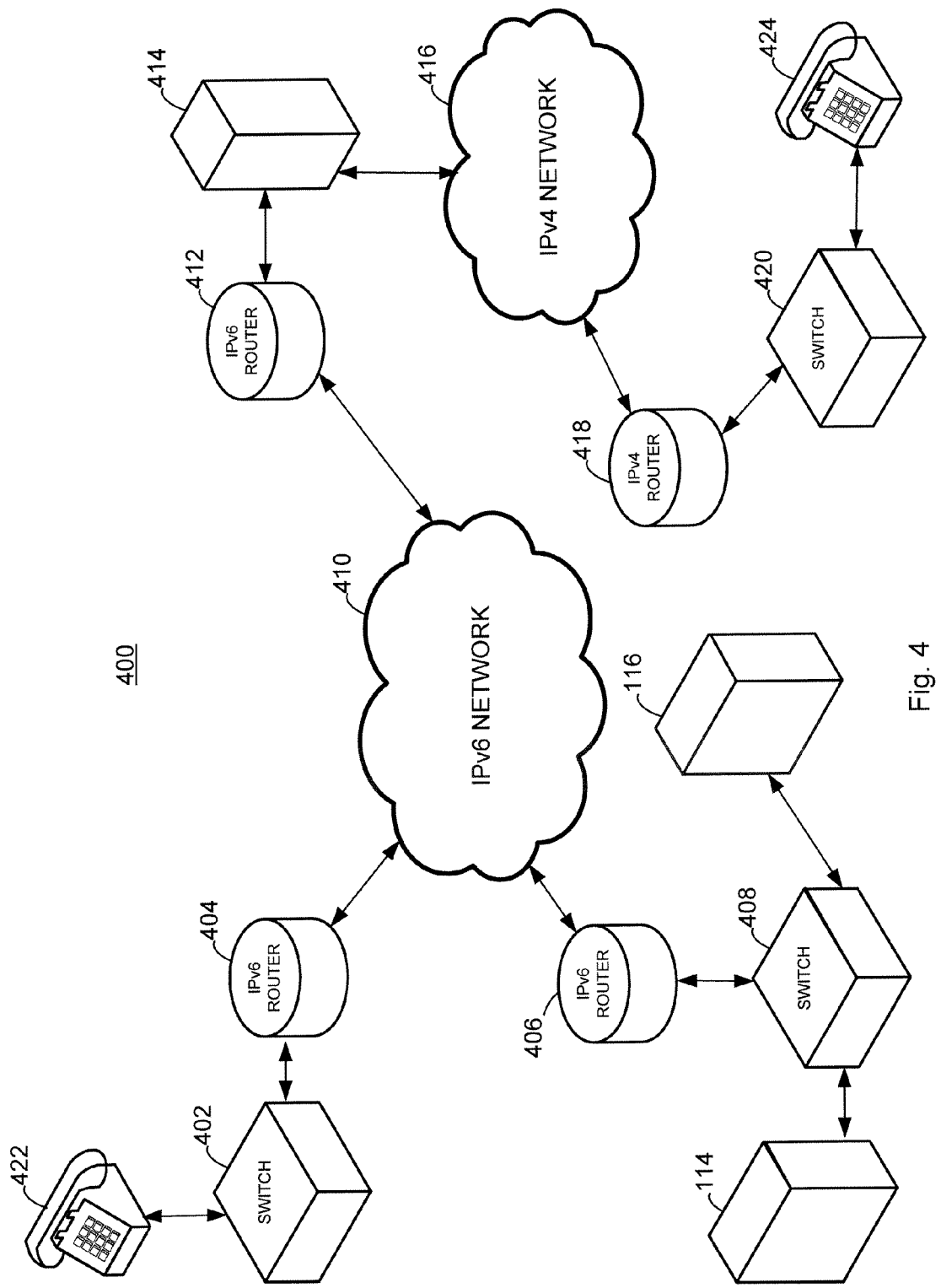
FIG. 4 is a schematic diagram illustrating a system according to a particular embodiment involving a call routed from an IPv6 fixed phone to an IPv4 fixed phone.

FIG. 4 is a schematic diagram illustrating a system according to a particular embodiment involving a call routed from an IPv6 fixed phone to an IPv4 fixed phone. A system 400 may include an IPv6 fixed phone 422 (e.g., origination user agent 102), a switch 402, an IPv6 router 404, an IPv6 network 410 (which may be part of network 104 or network 124, for example), an IPv6 router 406, a switch 408, the resolution computer system 114, the network service computer system 116, an IPv6 router 412, an IPv6/IPv4 gateway 414, an IPv4 network 416 (which may be part of network 104 or network 124, for example), an IPv4 router 418, a switch 420, and an IPv4 fixed phone 424 (e.g., destination user agent 110).

Figure 5:
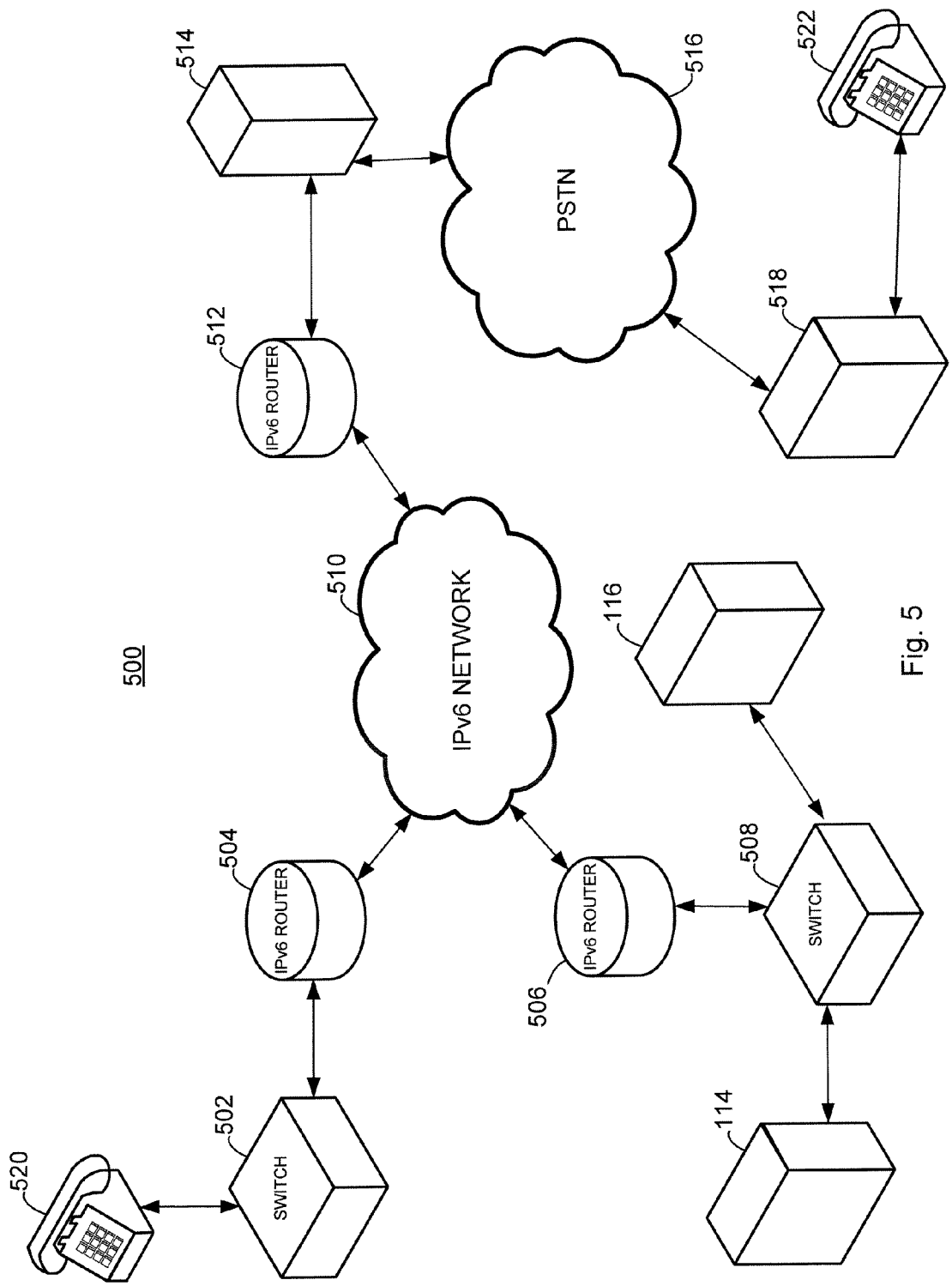
FIG. 5 is a schematic diagram illustrating a system according to a particular embodiment involving a call routed from an IPv6 fixed phone to a fixed analog phone.

FIG. 5 is a schematic diagram illustrating a system according to a particular embodiment involving a call routed from an IPv6 fixed phone to a fixed analog phone. A system 500 may include an IPv6 fixed phone 520 (e.g., origination user agent 102), a switch 502, an IPv6 router 504, an IPv6 network 510 (which may be part of network 104 or network 124, for example), an IPv6 router 506, a switch 508, the resolution computer system 114, the network service computer system 116, an IPv6 router 512, an IPv6/PSTN gateway 514, a PSTN 516 (which may be part of network 104 or network 124, for example), an ISDN switch 518, and a fixed analog phone 522 (e.g., destination user agent 110).

Figure 6:
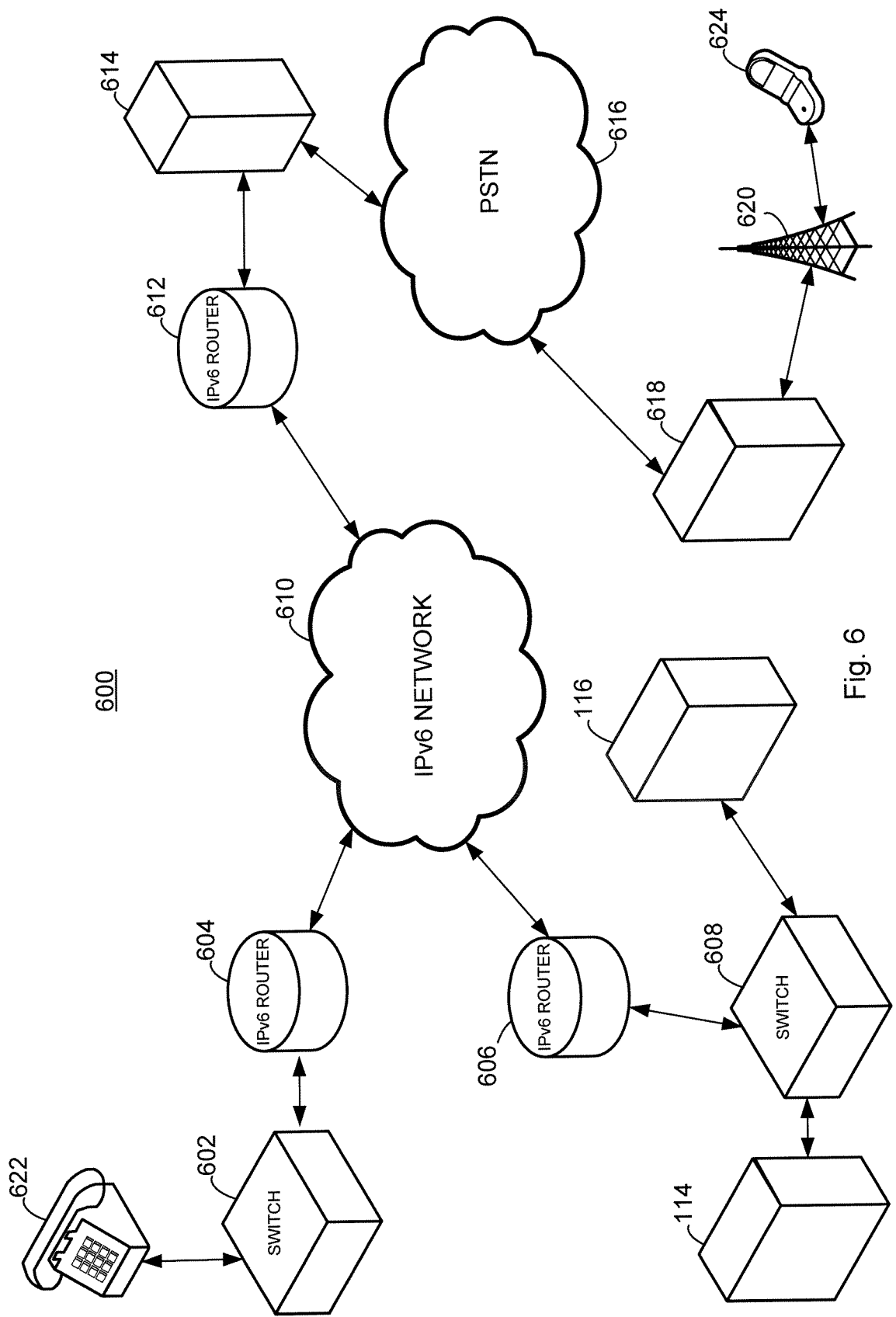
FIG. 6 is a schematic diagram illustrating a system according to a particular embodiment involving a call routed from an IPv6 fixed phone to a mobile analog phone.

FIG. 6 is a schematic diagram illustrating a system according to a particular embodiment involving a call routed from an IPv6 fixed phone to a mobile analog phone. A system 600 may include an IPv6 fixed phone 622 (e.g., origination user agent 102), a switch 602, an IPv6 router 604, an IPv6 network 610 (which may be part of network 104 or network 124, for example), an IPv6 router 606, a switch 608, the resolution computer system 114, the network service computer system 116, an IPv6 router 612, an IPv6/PSTN gateway 614, a PSTN 616 (which may be part of network 104 or network 124, for example), an ISDN switch 618, wireless network elements 620, and a mobile analog phone 624 (e.g., destination user agent 110).

Figure 7:
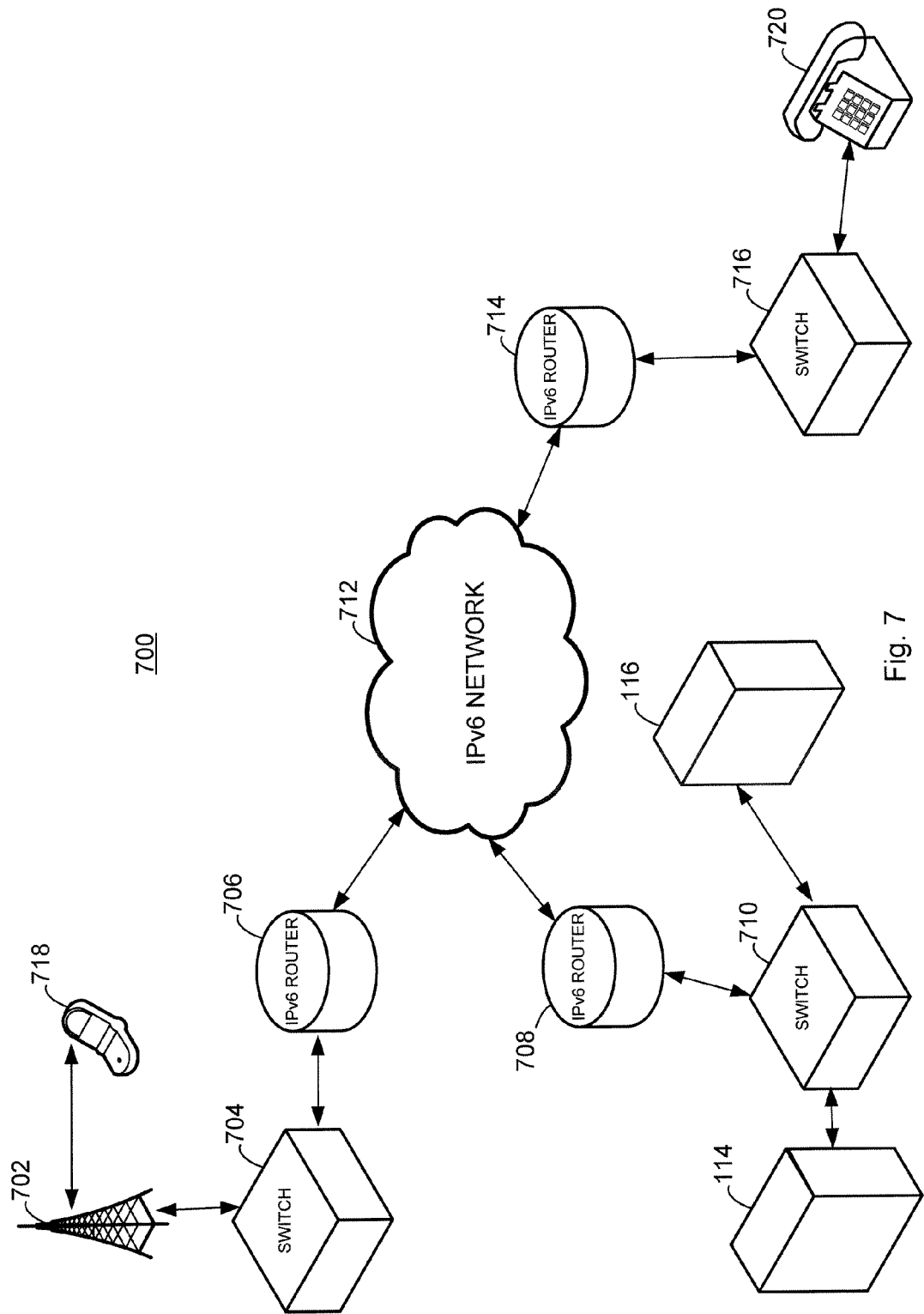
FIG. 7 is a schematic diagram illustrating a system according to a particular embodiment involving a call routed from an IPv6 mobile phone to an IPv6 fixed phone.

FIG. 7 is a schematic diagram illustrating a system according to a particular embodiment involving a call routed from an IPv6 mobile phone to an IPv6 fixed phone. A system 700 may include an IPv6 mobile phone 718 (e.g., origination user agent 102), wireless network elements 702, a switch 704, an IPv6 router 706, an IPv6 network 712 (which may be part of network 104 or network 124, for example), an IPv6 router 708, a switch 710, the resolution computer system 114, the network service computer system 116, an IPv6 router 714, a switch 716, and an IPv6 fixed phone 720 (e.g., destination user agent 110).

Figure 8:
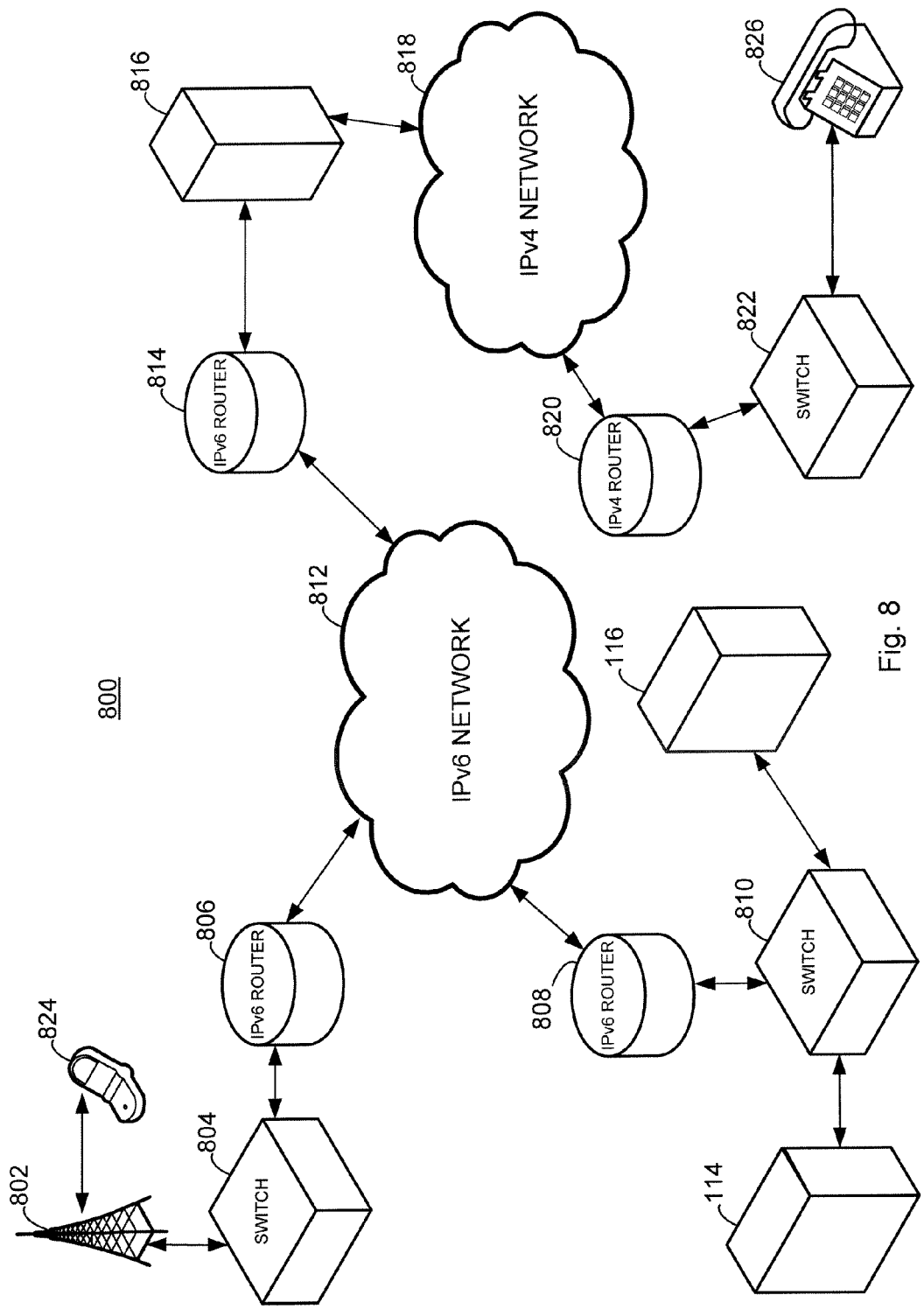
FIG. 8 is a schematic diagram illustrating a system according to a particular embodiment involving a call routed from an IPv6 mobile phone to an IPv4 fixed phone.

FIG. 8 is a schematic diagram illustrating a system according to a particular embodiment involving a call routed from an IPv6 mobile phone to an IPv4 fixed phone. A system 800 may include an IPv6 mobile phone 824 (e.g., origination user agent 102), wireless network elements 802, a switch 804, an IPv6 router 806, an IPv6 network 812 (which may be part of network 104 or network 124, for example), an IPv6 router 808, a switch 810, the resolution computer system 114, the network service computer system 116, an IPv6 router 814, an IPv6/IPv4 gateway 816, an IPv4 network 818 (which may be part of network 104 or network 124, for example), an IPv4 router 820, a switch 822, and an IPv4 fixed phone 826 (e.g., destination user agent 110).

Figure 9:
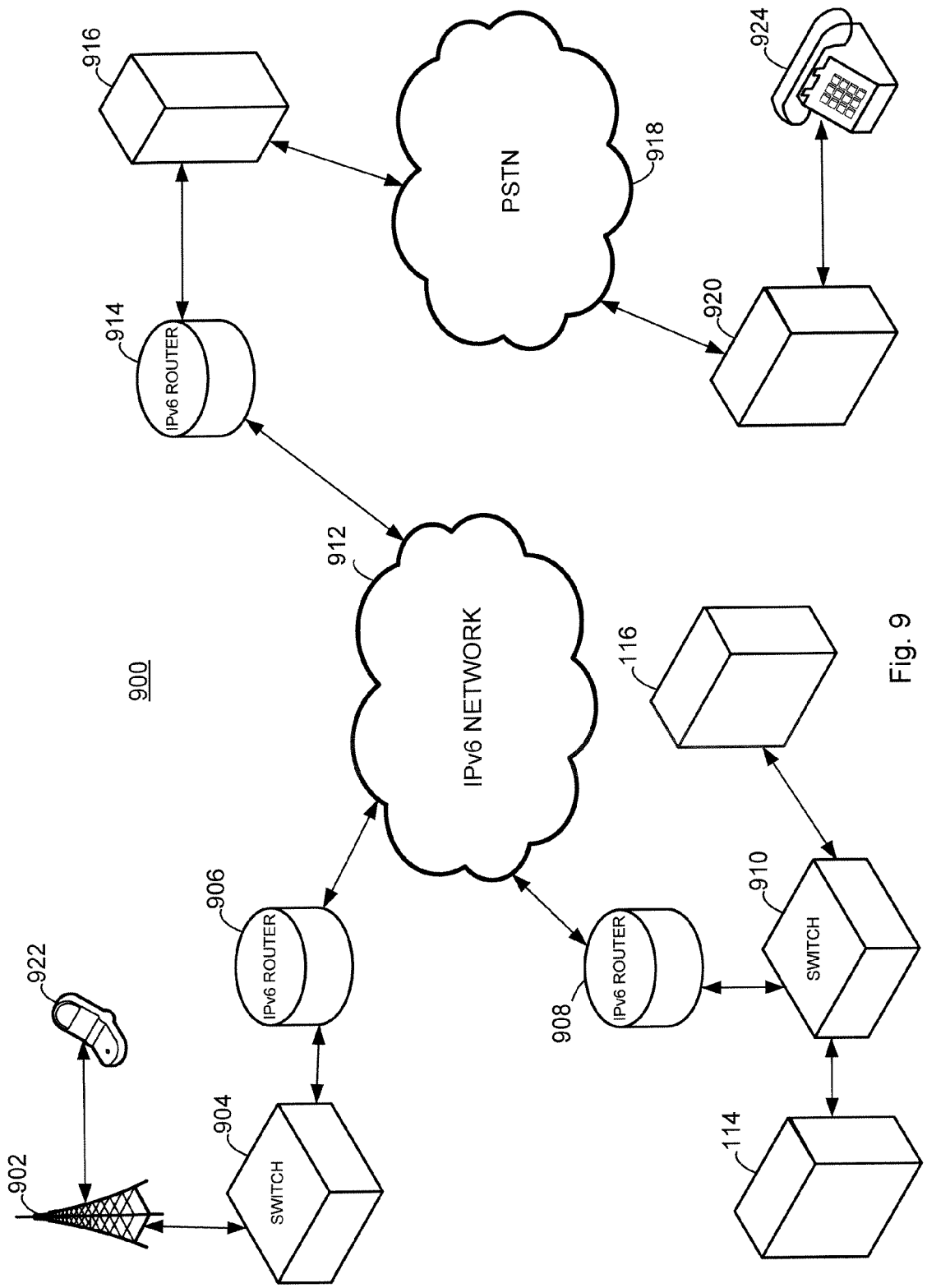
FIG. 9 is a schematic diagram illustrating a system according to a particular embodiment involving a call routed from an IPv6 mobile phone to a fixed analog phone.

FIG. 9 is a schematic diagram illustrating a system according to a particular embodiment involving a call routed from an IPv6 mobile phone to a fixed analog phone. A system 900 may include an IPv6 mobile phone 922 (e.g., origination user agent 102), wireless network elements 902, a switch 904, an IPv6 router 906, an IPv6 network 912 (which may be part of network 104 or network 124, for example), an IPv6 router 908, a switch 910, the resolution computer system 114, the network service computer system 116, an IPv6 router 914, an IPv6/PSTN gateway 916, a PSTN 918 (which may be part of network 104 or network 124, for example), an ISDN switch 920, and a fixed analog phone 924 (e.g., destination user agent 110).

Figure 10:
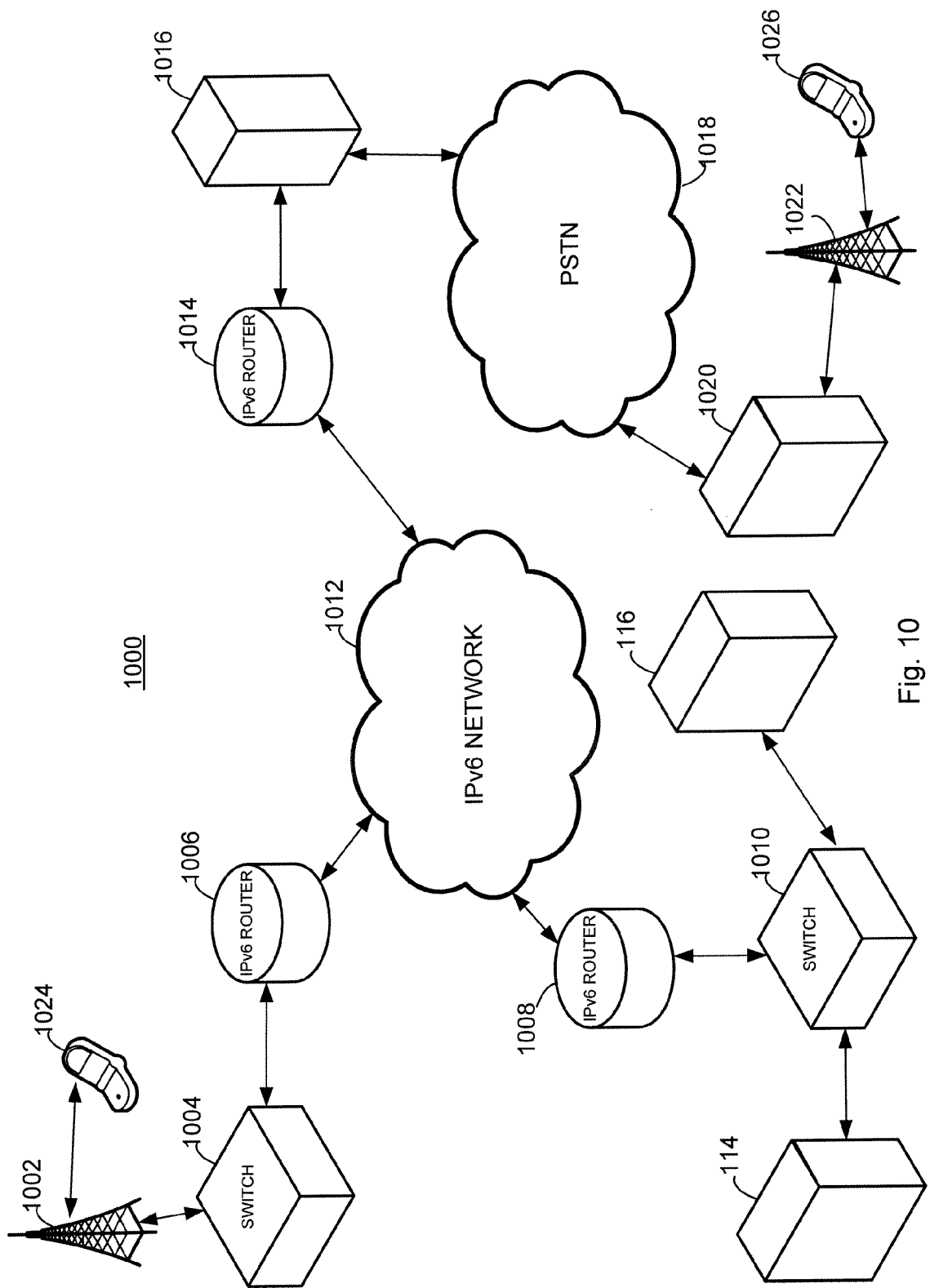
FIG. 10 is a schematic diagram illustrating a system according to a particular embodiment involving a call routed from an IPv6 mobile phone to a mobile analog phone.

FIG. 10 is a schematic diagram illustrating a system according to a particular embodiment involving a call routed from an IPv6 mobile phone to a mobile analog phone. A system 1000 may include an IPv6 mobile phone 1024 (e.g., origination user agent 102), first wireless network elements 1002, a switch 1004, an IPv6 router 1006, an IPv6 network 1012 (which may be part of network 104 or network 124, for example), an IPv6 router 1008, a switch 1010, the resolution computer system 114, the network service computer system 116, an IPv6 router 1014, an IPv6/PSTN gateway 1016, a PSTN 1018 (which may be part of network 104 or network 124, for example), an ISDN switch 1020, second wireless network elements 1022, and a mobile analog phone 1026 (e.g., destination user agent 110).

Figure 11:
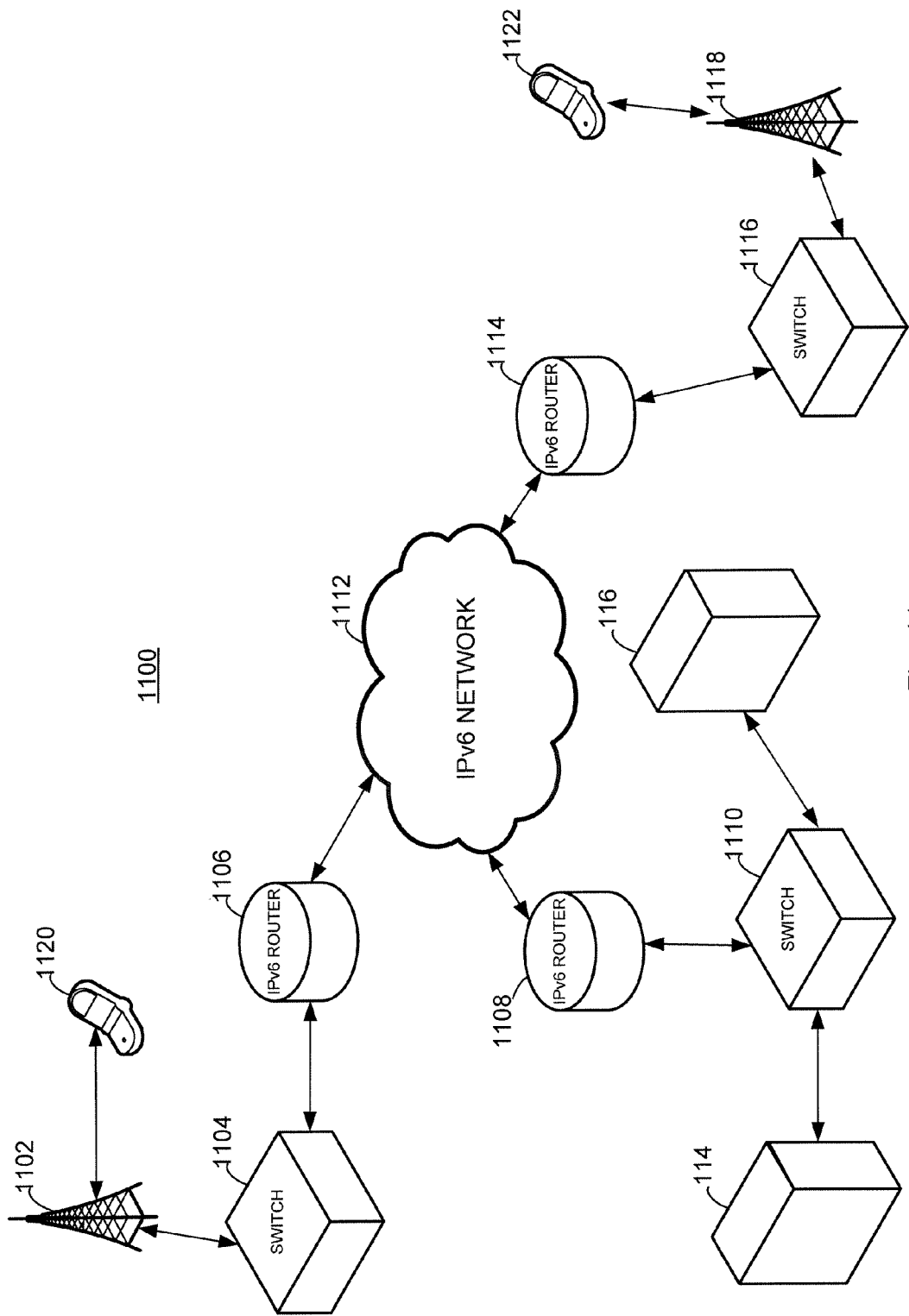
FIG. 11 is a schematic diagram illustrating a system according to a particular embodiment involving a call routed from an IPv6 mobile phone to another IPv6 mobile phone.

FIG. 11 is a schematic diagram illustrating a system according to a particular embodiment involving a call routed from an IPv6 mobile phone to another IPv6 mobile phone. A system 1100 may include a first IPv6 mobile phone 1120 (e.g., origination user agent 102), first wireless network elements 1102, a switch 1104, an IPv6 router 1106, an IPv6 network 1112 (which may be part of network 104 or network 124, for example), an IPv6 router 1108, a switch 1110, the resolution computer system 114, the network service computer system 116, an IPv6 router 1114, a switch 1116, second wireless network elements 1118, and a second IPv6 mobile phone 1122 (e.g., destination user agent 110).

Figure 12:
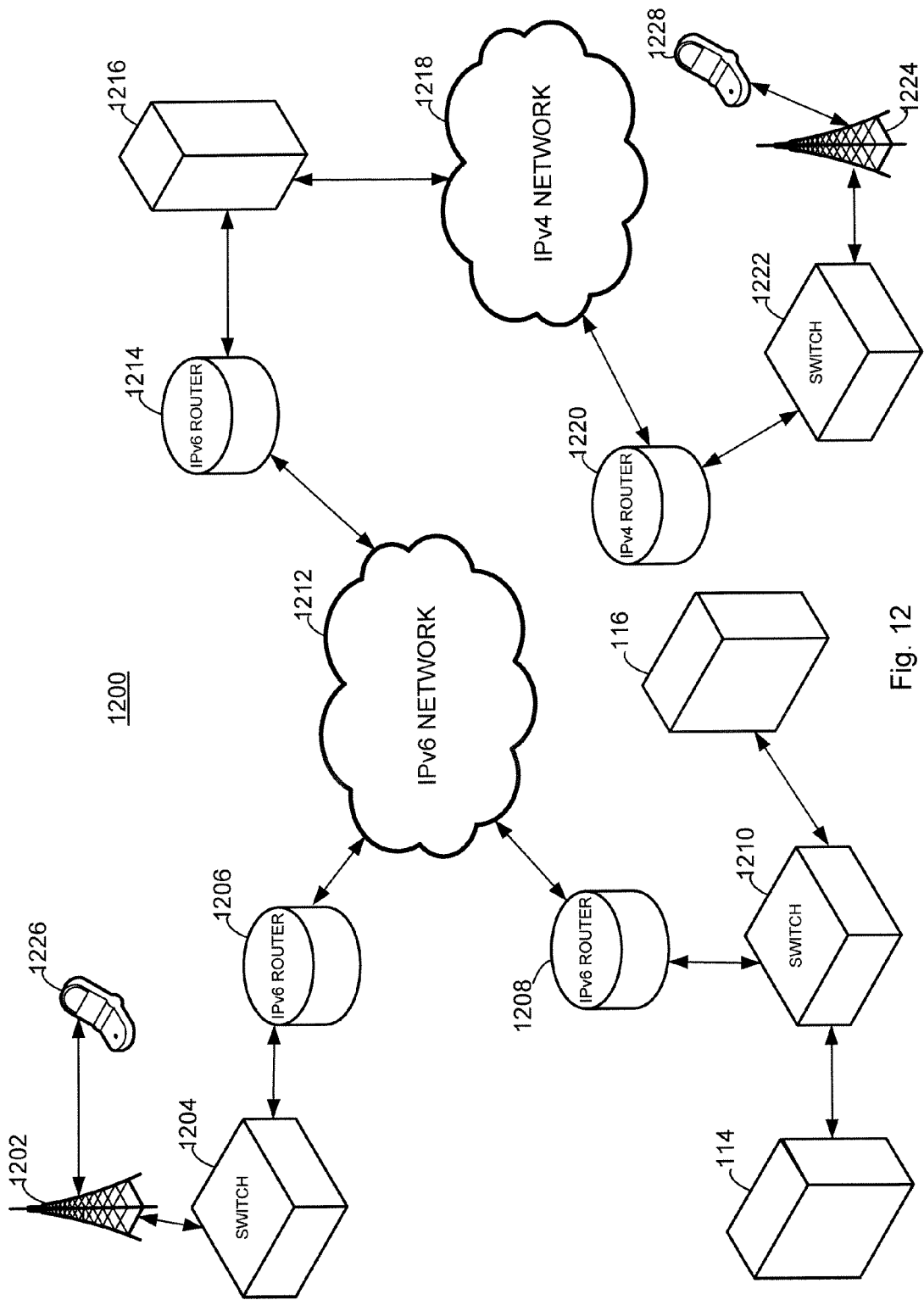
FIG. 12 is a schematic diagram illustrating a system according to a particular embodiment involving a call routed from an IPv6 mobile phone to an IPv4 mobile phone.

FIG. 12 is a schematic diagram illustrating a system according to a particular embodiment involving a call routed from an IPv6 mobile phone to an IPv4 mobile phone. A system 1200 may include an IPv6 mobile phone 1226 (e.g., origination user agent 102), first wireless network elements 1202, a switch 1204, an IPv6 router 1206, an IPv6 network 1212 (which may be part of network 104 or network 124, for example), an IPv6 router 1208, a switch 1210, the resolution computer system 114, the network service computer system 116, an IPv6 router 1214, an IPv6/IPv4 gateway 1216, an IPv4 network 1218 (which may be part of network 104 or network 124, for example), an IPv4 router 1220, a switch 1222, second wireless network elements 1224, and an IPv4 mobile phone 1228 (e.g., destination user agent 110).

It is noted that any of the systems described with reference to FIGS. 3-12 may also be performed in reverse (e.g., where destination user agent 110 initiates a call to origination user agent 102). For example, system 400 of FIG. 4 may be a system for routing a call from an IPv4 fixed phone to an IPv6 fixed phone.

Figure 13:
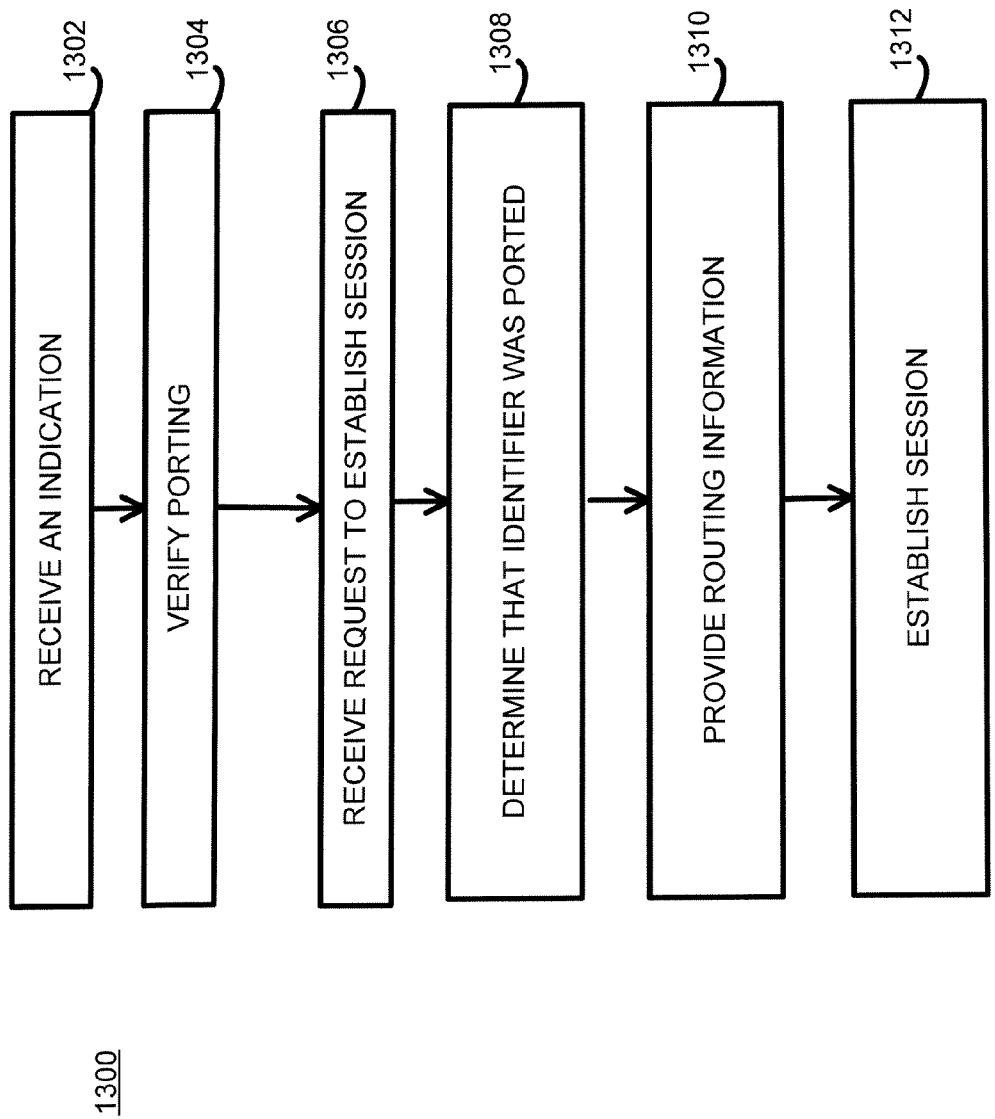
FIG. 13 is a flowchart illustrating the functionality of a particular embodiment.

FIG. 13 is a flowchart illustrating the functionality of a particular embodiment. This method is provided by way of example, as there are a variety of ways to carry out the methods described herein. Method 1300 shown in FIG. 13 may be executed or otherwise performed by one or a combination of various systems. The method 1300 may be carried out through system 100 of FIG. 1 and/or any of the systems depicted in FIGS. 3-12 by way of example, and various elements of FIG. 1 and FIGS. 3-12 are referenced in explaining method 1300 of FIG. 13. Each block shown in FIG. 13 represents one or more processes, methods, or subroutines carried out in method 1300. Method 1300 may begin at block 1302.

At block 1302, referral computer system 114 may receive an indication that an identifier (e.g., a telephone number) was ported from first service provider 106 to second service provider 108. For example, second service provider 108 may provide an electronic or other type of message alerting referral computer system 114. Or referral computer system 114 may receive a request to establish a call to destination user agent 110, query first service provider 106 (based on information currently known by referral computer system 114) to complete the call, and receive an indication from first service provider 106 that the telephone number was ported and first service provider 106 is no longer responsible for it. The indication may be stored in a cache for period of time (e.g., 24 hours).

At block 1304, referral computer system 114 may verify with, for example, first service provider 106 or second service provider 108, that the number was ported.

At block 1306, referral computer system 114 may receive a request to establish a session (e.g., a call) between origination user agent 102 and destination user agent 110. For example, a user operating origination user agent 102 may dial a particular telephone number, which may cause a request to be submitted by various service portals and/or network 104 to referral computer system 114. The request may include the dialed number. The request may be passed over one or more different types of networks (e.g., IPv4 networks, IPv6 networks, PSTN, wireless networks) to reach referral computer system 114.

At block 1308, referral computer system 114 may determine that the identifier (e.g., dialed telephone number) was ported, for example, based on the indication described herein.

At block 1310, referral computer system 114 may provide routing information for establishing the session (e.g., completing the call), as described herein. For example, the routing information may be provided to a service portal so that the call can be appropriately routed through second service provider 108 rather than first service provider 106.

At block 1312, network service computer system 116 and/or referral computer system 110 may establish the call (e.g., a SIP session between two IP phones). The call stream may then proceed. After the call is finished, the session may be terminated using, for example, network service computer system 116.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

The invention claimed is:

1. A computer-implemented method, comprising:
   receiving an indication that a destination user agent identifier was ported from a first service provider to a second service provider, wherein the indication is from the first service provider, wherein the indication results from querying the first service provider for a previous session and receiving the indication from the first service provider in response to the querying;
   receiving a request to establish a session between an origination user agent and a destination user agent, the request comprising the destination user agent identifier, wherein the origination user agent is associated with at least one Internet Protocol version 6 (IPv6) network and the destination user agent is associated with at least one non-IPv6 network;
   using one or more computer processors, determining that the destination user agent identifier was ported from the first service provider to the second service provider based on the indication from the first service provider; and
   providing routing information for establishing the session from the origination user agent to the destination user agent through the second service provider rather than through the first service provider, wherein the session is established over one or more Internet protocol networks.

2. The method of claim 1, further comprising:
   prior to receiving the request, verifying with the first service provider that the destination user agent identifier was ported from the first service provider to the second service provider.

3. The method of claim 1, wherein the indication is stored in a cache for a fixed period of time.

4. The method of claim 1, wherein determining that the destination user agent identifier was ported from the first service provider to the second service provider comprises querying the first service provider.

5. The method of claim 1, wherein the session is established as a Session Initiation Protocol (SIP) session using a Network Server/Redirect Server (NS/RS).

6. The method of claim 1, further comprising:
establishing the session based on the routing information.

7. A non-transitory computer readable medium comprising code to perform the steps of the methods of claim 1.

8. The method of claim 1, wherein at least one of the one or more internet protocol networks is an IPv6 network.

9. The method of claim 1, wherein the at least one non-IPv6 network is an Internet Protocol version 4 (IPv4) network.

10. The method of claim 1, wherein the at least one non-IPv6 network is a public switch telephone network (PSTN).

11. The method of The method of claim 1, wherein the routing information includes instructions for routing the call between an IPv6 network and a non-IPv6 network.

12. A computer-based system, comprising:
a communication processor configured to receive an indication that a destination user agent identifier was ported from a first service provider to a second service provider, wherein the indication is from the first service provider, the communication processor further configured to receive a request to establish a session between an origination user agent and a destination user agent, the request comprising the destination user agent identifier, wherein the indication results from querying the first service provider for a previous session and receiving the indication from the first service provider in response to the querying, wherein the origination user agent is associated with at least one Internet Protocol version 6 (IPv6) network and the destination user agent is associated with at least one non-IPv6 network;

a determination processor configured to determine that the destination user agent identifier was ported from the first service provider to the second service provider based on the indication from the first service provider; and a routing processor configured to provide routing information for establishing the session from the origination user agent to the destination user agent through the second service provider rather than through the first service provider, wherein the session is established over one or more Internet protocol networks.

13. The system of claim 12, wherein the communication processor is further configured to, prior to receiving the request, verify with the first service provider that the destination user agent identifier was ported from the first service provider to the second service provider.

14. The system of claim 12, wherein the indication is stored in a cache for a fixed period of time.

15. The system of claim 12, wherein determining that the destination user agent identifier was ported from the first service provider to the second service provider comprises querying the first service provider.

16. The system of claim 12, wherein the session is established as a Session Initiation Protocol (SIP) session using a Network Server/Redirect Server (NS/RS).

17. The system of claim 12, wherein the routing processor is further configured to establish the session based on the routing information.

18. The system of claim 12, wherein at least one of the communication processor, determination processor, and routing processor is configured as a Domain Name System (DNS) server.

19. The system of claim 12, wherein the at least one non-IPv6 network is one of an IPv4 network and a PSTN network.

20. The system of claim 12, wherein the routing information includes instructions for routing the call between an IPv6 network and a non-IPv6 network.

* * * * *